United States Patent
Lin et al.

(10) Patent No.: US 10,260,004 B2
(45) Date of Patent: Apr. 16, 2019

(54) METHOD FOR DIRECT LIQUEFACTION OF BIOMASS

(71) Applicant: Beijing Huashi United Energy Technology and Development Co., Ltd, Beijing (CN)

(72) Inventors: Ke Lin, Beijing (CN); Lin Li, Beijing (CN); Lixin Guo, Beijing (CN); Yongjun Cui, Beijing (CN); Lilong Jiang, Beijing (CN)

(73) Assignee: Beijing Huashi United Energy Technology and Development Co., Ltd., Beijing (CN)

( * ) Notice: Subject to any disclaimer, the term of this patent is extended or adjusted under 35 U.S.C. 154(b) by 0 days.

(21) Appl. No.: 15/818,360

(22) Filed: Nov. 20, 2017

(65) Prior Publication Data
US 2018/0142162 A1 May 24, 2018

(30) Foreign Application Priority Data
Nov. 21, 2016 (CN) .......................... 2016 1 1043908

(51) Int. Cl.
*C10G 1/06* (2006.01)
*C10G 1/00* (2006.01)
(Continued)

(52) U.S. Cl.
CPC .............. *C10G 1/065* (2013.01); *B01D 3/10* (2013.01); *B01D 3/143* (2013.01); *C10G 1/002* (2013.01);
(Continued)

(58) Field of Classification Search
CPC ... C10G 1/06; C10G 1/00; C10G 7/00; C10G 45/00
See application file for complete search history.

(56) References Cited

U.S. PATENT DOCUMENTS

| 8,623,102 B2 * | 1/2014 | Quignard ................. C10G 1/08 44/307 |
| 2014/0275299 A1 * | 9/2014 | Bedwell ................... C07C 1/12 518/704 |

FOREIGN PATENT DOCUMENTS

| CN | 1307926 | 8/2001 |
| CN | 201351763 | 11/2009 |

(Continued)

*Primary Examiner* — Youngsul Jeong
(74) *Attorney, Agent, or Firm* — Nicholas J. Landau; Bradley Arant Boult Cummings LLP

(57) ABSTRACT

The present invention discloses a method for direct liquefaction of biomass. The method comprises the following steps: (1) mixing a biomass, a hydrogenation catalyst and a hydrogen-donor solvent to prepare a biomass slurry; (2) carrying out a first liquefaction reaction with the biomass slurry and hydrogen gas to obtain a first reaction product; (3) carrying out a second liquefaction reaction with the first reaction product and hydrogen gas to obtain a second reaction product; (4) subjecting the second reaction product to a first gas-liquid separation at a temperature of 290-460 DEG C. to produce a first liquid phase and a first gas phase; (5) subjecting the first gas phase to a second gas-liquid separation at a temperature of 30-60 DEG C. to obtain a second liquid phase, and mixing the first liquid phase with the second liquid phase to obtain a liquid phase mixture; (6) carrying out a first distillation on the liquid phase mixture to obtain a light fraction and a heavy fraction; and (7) carrying out a second distillation on the heavy fraction to separate out a distillate oil and a residue, wherein the light fraction and the distillate oil are final liquid of the liquefaction. By utilizing the method for direct liquefaction of biomass, the obtained final liquid has a high yield and a low solid content of residue.

16 Claims, 1 Drawing Sheet

(51) Int. Cl.
  *C10G 7/00*  (2006.01)
  *C10G 45/00* (2006.01)
  *B01D 3/14*  (2006.01)
  *B01D 3/10*  (2006.01)

(52) U.S. Cl.
  CPC ............... *C10G 7/00* (2013.01); *C10G 45/00* (2013.01); *C10G 2300/1014* (2013.01); *C10G 2300/42* (2013.01); *C10G 2300/44* (2013.01)

(56) References Cited

FOREIGN PATENT DOCUMENTS

| CN | 102127462 | 7/2011 |
| CN | 102310005 | 1/2012 |
| CN | 103242871 | 8/2013 |
| CN | 204051658 | 12/2014 |
| CN | 104388117 | 3/2015 |
| CN | 104588079 | 5/2015 |
| CN | 204752627 | 11/2015 |

\* cited by examiner

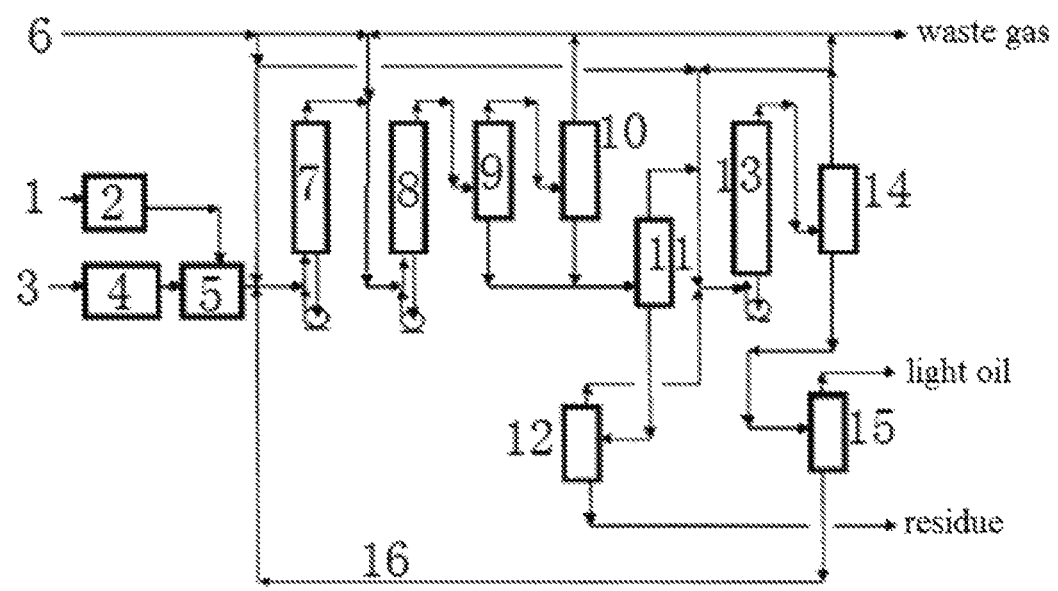

METHOD FOR DIRECT LIQUEFACTION OF BIOMASS

CROSS REFERENCE TO RELATED APPLICATIONS

This application cites the priority of Chinese Patent Application No. 201611043908.6 filed on 21 Nov. 2016 (pending). The contents of the foregoing application are incorporated by references in its entirety, although the prosecution histories of the foregoing application is not incorporated by reference.

TECHNICAL FIELD

The present invention belongs to the technical field of biomass liquefaction, and particularly relates to a method for direct liquefaction of biomass.

BACKGROUND

In a broad sense, biomass includes all plants, microorganisms, and animals eating plants and microorganisms and their wastes; while in a narrow sense, biomass mainly refers to lignocellulose (called lignin for short), such as straws, woods and the like other than grains and fruits, in agroforestry production processes, leftovers of agricultural product processing industries, agricultural and forestry wastes, and poultry and livestock feces and wastes in animal husbandry production processes. Common representative biomass includes crops, agricultural wastes, wood, wood wastes, animal wastes and the like. Biomass has become an important part of renewable energy due to its characteristics of renewability, low pollution and wide distribution. Therefore, high-efficiency development and utilization of biomass energy will play a great positive role in solving energy and ecological environment problems.

At present, biomass energy is mainly developed and utilized in the following ways: (1) direct combustion: biomass is directly combusted, and heat produced by combustion is directly utilized or is utilized to further generate electric energy; (2) physical-chemical process: biomass is processed into briquettes through physical-chemical treatments and compression molding; (3) biochemical process: biomass is hydrolyzed and fermented to produce ethanol, or biomass is processed to produce biogas through biogas technologies; and (4) thermochemical process: biomass is gasified to produce biomass gas, or biomass is subjected to pyrolysis to produce charcoal or a biomass crude oil, or biomass is directly liquefied to produce a liquefied oil, and the like; wherein said process that biomass is directly liquefied to produce a liquefied oil is generally carried out as follows: a biomass and hydrogen gas directly react under the action of a catalyst under a high pressure, and the biomass is converted into a liquid fuel.

Chinese patent CN 102127462 A has disclosed a direct biomass hydroliquefaction process comprising two ebullated bed hydroconversion steps. The process comprises the following steps: a) a step of preparing a suspension of biomass particles in a solvent, preferably a hydrogen-donor solvent; b) a first hydroconversion step carried out in the presence of hydrogen gas by reacting the suspension in at least one reactor containing an ebullated bed catalyst and operating at a temperature of 300-440 DEG C. under a total pressure of 15-25 MPa with an hourly mass velocity of 0.1-5 $h^{-1}$ and a hydrogen/feed ratio of 0.1-2 $Nm^3$/kg; and c) a second hydroconversion step carried out in the presence of hydrogen gas by reacting at least a proportion of an effluent obtained in the step b) in at least one reactor containing an ebullated bed catalyst and operating at a temperature of 350-470 DEG C. under a total pressure of 15-25 MPa with an hourly mass velocity of 0.1-5 $h^{-1}$ and a hydrogen/feed ratio of 0.1-2 $Nm^3$/kg. At last, an effluent obtained at the end of the second hydroconversion step is subjected to separation for separating out a gas phase, an aqueous phase, at least one light fraction of liquid hydrocarbons of naphtha, kerosene and/or diesel type, a residue and the like. According to the above process, a biomass raw material is directly liquefied into liquid substances through the two second hydroconversion steps, and the residue is separated out at the bottom of the reactor at the end of the second hydroconversion step, however, such operation mode has the following defects: 1) the residue carries too much liquid substances, which causes waste of the liquid substances and influences yield of the liquid substances; and 2) a part of the residue suspends in the liquid-phase substances and enters the next working procedure, which causes high solid content of residue in the final light oil.

SUMMARY

Therefore, the present invention is to overcome the defects that the existing biomass liquefaction method has a low liquid yield and a high solid content of residue, and provides a method for direct liquefaction of biomass, which has a high liquid yield and a low solid content of residue.

The method for direct liquefaction of biomass, provided by the present invention, comprises the following steps:
  (1) mixing a biomass, a hydrogenation catalyst and a hydrogen-donor solvent to prepare a biomass slurry;
  (2) carrying out a first liquefaction reaction with the biomass slurry and hydrogen gas to obtain a first reaction product;
  (3) carrying out a second liquefaction reaction with the first reaction product and hydrogen gas to obtain a second reaction product;
  (4) subjecting the second reaction product to a first gas-liquid separation at a temperature of 290-460 DEG C. to produce a first liquid phase and a first gas phase;
  (5) subjecting the first gas phase to a second gas-liquid separation at a temperature of 30-60 DEG C. to obtain a second liquid phase, and mixing the first liquid phase with the second liquid phase to obtain a liquid phase mixture;
  (6) carrying out a first distillation on the liquid phase mixture to obtain a light fraction and a heavy fraction; and
  (7) carrying out a second distillation on the heavy fraction to separate out a distillate oil and a residue, wherein the light fraction and the distillate oil are final liquid of the liquefaction.

Preferably, the step (1) comprises the following steps:
  (a) drying the biomass to obtain a dried biomass, and crushing the dried biomass to obtain a crushed material;
  (b) mixing the crushed material with the hydrogenation catalyst to obtain a mixture; and
  (c) mixing the mixture with the hydrogen-donor solvent to prepare the biomass slurry.

Preferably, in the step (1), a mass ratio of the biomass to the hydrogenation catalyst is 100: (1-5);
  the crushed material has a particle size of 5-2000 microns;
  the hydrogenation catalyst has a particle size of 10-20 microns; and the hydrogenation catalyst comprises at least one selected from a group consisting of the following catalysts:
1) amorphous iron oxide and/or amorphous iron oxide hydroxide; and
2) amorphous alumina loading an active component, wherein the active component comprises at least one selected from oxides of metals of group VIB, group VIIB and group VIII, and the active component has a content of 10-25 wt %.

Preferably, in the step (2), reaction conditions for the first liquefaction reaction are as follows:
a reaction temperature is 300-470 DEG C.;
a reaction pressure is 13-25 MPa;
a gas-liquid ratio is 800-1500 NL/kg; and
a space velocity of the biomass slurry is 0.3-2 t/m3·h.

Further preferably, reaction conditions for the first liquefaction reaction are as follows:
a reaction temperature is 450-470 DEG C.;
a reaction pressure is 13-14 MPa;
a gas-liquid ratio is 800-1500 NL/kg; and
a space velocity of the biomass slurry is 0.3-2 t/m$^3$·h.

Preferably, in the step (3), reaction conditions for the second liquefaction reaction are as follows:
a reaction temperature is 300-470 DEG C.;
a reaction pressure is 13-25 MPa;
a gas-liquid ratio is 800-1500 NL/kg; and
a space velocity of the biomass slurry is 0.3-2 t/m$^3$·h.

Further preferably, in the step (3), reaction conditions for the second liquefaction reaction are as follows:
a reaction temperature is 300-340 DEG C.;
a reaction pressure is 13-14 MPa;
a gas-liquid ratio is 800-1500 NL/kg; and
a space velocity of the biomass slurry is 0.3-2 t/m$^3$·h.

Preferably, in the step (6), the first distillation is carried out at a temperature of 260-400 DEG C. under a pressure of 0.1-0.7 MPa; and
in the step (6), the second distillation is carried out at a temperature of 300-400 DEG C. under a pressure of 5-20 kPa.

Preferably, the step (5) further comprises steps of collecting a second gas phase obtained after the second gas-liquid separation, mixing the second gas phase with the hydrogen gas in the step (2) and/or the step (3) to obtain a gas mixture, and introducing the gas mixture into a reaction system.

Preferably, the method further comprises steps of carrying out a hydrogenation reaction on the final liquid to obtain a hydrogenation product, and subjecting the hydrogenation product to a fractionation operation to obtain a light oil and a heavy oil; and returning the heavy oil to the step (1) to be used as the hydrogen-donor solvent.

Preferably, reaction conditions for the hydrogenation reaction are as follows:
a reaction temperature is 300-430 DEG C.;
a reaction pressure is 13-25 MPa;
a gas-liquid ratio is 800-1500 NL/kg;
a space velocity is 0.5-2 h$^{-1}$; and
the fractionation is carried out at a temperature of 280-390 DEG C.

Preferably, before subjecting the hydrogenation product to the fractionation operation, the method further comprises steps of subjecting the hydrogenation product to a third gas-liquid separation to obtain a third gas phase and a third liquid phase; and mixing the third gas phase with the hydrogen gas in the step (2) and/or the step (3) to obtain a gas mixture and introducing the gas mixture into the reaction system, or discharging the third gas phase to the outside, and subjecting the third liquid phase to the fractionation operation.

Preferably, the biomass slurry has a biomass content of 10-50 wt %.

The biomass is a material prepared from plants, microorganisms, and animals eating plants and microorganisms and their wastes through drying and crushing.

The hydrogen-donor solvent comprises at least one selected from a group consisting of the heavy oil obtained by subjecting the hydrogenation product to the fractionation operation, vegetable oil, animal oil, coal tar and a slurry of a catalytic cracking device.

Compared with the prior art, the present invention has the following beneficial effects:
1) according to the method for direct liquefaction of biomass, provided by the embodiments of the present invention, the biomass slurry is successively subjected to the first liquefaction reaction and the second liquefaction reaction, so that it is ensured that the biomass is fully liquefied into a liquid phase, and the yield of liquid is improved; the obtained second reaction product is successively subjected to the first gas-liquid separation at a temperature of 290-460 DEG C. and the second gas-liquid separation at a temperature of 30-60 DEG C., the gas-phase hydrogen is separated out in advance, and the first liquid phase and the second liquid phase are mixed to obtain the liquid phase mixture; due to the two steps of gas-liquid separation, oil products are enriched, and meanwhile, the residue in the oil products is enriched and caked; the oil products are then subjected to the first distillation to obtain the light fraction and the heavy fraction; and finally the heavy fraction is subjected to the second distillation to obtain the distillate oil and the residue, wherein the light fraction and the distillate oil are the final liquid oil, and the liquid oil is completely distillated through the first distillation and the second distillation, especially the liquid oil in the residue can also be distillated out through the two steps of distillation, so that the yield of the liquid oil is further improved; meanwhile, by means of the two steps of distillation operations, the residue in the liquid oil is further enriched and caked and is discharged to the outside through the bottom of the distillation device, thereby preventing the residue from entering the subsequent working procedures, and reducing the solid content of residue in the liquid oil; and based on tests, the biomass has a yield of the liquid oil of more than 98 wt %, and the liquid oil has a solid content of residue of lower than 0.5 wt %;
2) according to the method for direct liquefaction of biomass provided by the embodiments of the present invention, reaction parameters of the steps of liquefaction reactions, temperatures of the steps of separations, and reaction parameters of the steps of distillations are limited, so that the yield of the liquid oil of the biomass is increased to the maximum extent and the solid content of residue in the liquid oil is reduced;
3) according to the method for direct liquefaction of biomass provided by the embodiments of the present invention, the second gas-liquid separation is carried out to obtain the second gas phase, the second gas phase is mixed with the hydrogen gas in the step (2) and/or the step (3) to obtain the gas mixture, and the gas mixture is introduced into the reaction system, so that the second gas phase is utilized, and the liquefaction costs are reduced; and 4) according to the method for direct liquefaction of biomass provided by the embodiments of the present invention, the obtained liquid oil can further be subjected to the hydrogenation reaction to obtain the hydrogenation product, and the hydrogenation product is subjected to the fractionation operation to obtain the light oil and the heavy oil; and the heavy oil is returned to the step (1) to be used as the hydrogen-donor solvent; by means of the above-mentioned steps, conversion to light fraction of the liquid oil is achieved, and the heavy oil obtained after the fraction operation is also utilized; before the fractionation operation is carried out, the hydrogenation product is firstly subjected to the third gas-liquid separation to obtain the third gas phase and the third liquid phase; and the third gas phase is mixed with the hydrogen gas in the step (2) and/or the step (3) to obtain the gas mixture, the gas mixture is introduced into the reaction system, and the third liquid phase is subjected to the fractionation operation, so that various products and raw materials in the reactions are fully utilized.

BRIEF DESCRIPTION OF THE DRAWINGS

In order to illustrate the technical solutions in the embodiments of the present invention or in the prior art more clearly, a brief description to the accompanying drawings which are needed in the description of the embodiments or the prior art is given below. Apparently, the accompanying drawings in the description below are merely some of the embodiments of the present invention, based on which other drawings may be obtained by those of ordinary skill in the art without any creative effort.

The FIGURE is a flow diagram of a method for direct liquefaction of biomass, provided by the present invention.

REFERENCE SIGNS

1—biomass; 2—biomass pretreatment device; 3—hydrogenation catalyst raw material; 4—hydrogenation catalyst preparation device; 5—biomass slurry preparation device; 6—hydrogen gas; 7—first forced circulating suspended-bed reactor; 8—second forced circulating suspended-bed reactor; 9—high-temperature separator; 10—low-temperature separator; 11—distillation column; 12—vacuum distillation column; 13—liquefied oil forced circulating suspended-bed hydrogenation reactor; 14—gas-liquid separator; 15—product fractionating column; and 16—heavy oil.

DETAILED DESCRIPTION

To make the objectives, technical solutions and advantages of the present invention clearer, the following further describes the present invention in conjunction with embodiments. It should be understood that the present invention can be implemented in various forms, but not intent to be limited to the described embodiments. On the contrary, these embodiments are provided so that the present invention will be thorough and complete, and conceptions of the present invention will be fully conveyed to those skilled in the art. The present invention will be only limited by the appended claims.

In addition, technical features involved in different embodiments of the present invention described below can be combined with each other as long as they do not conflict with each other.

In each of the following embodiments and comparative examples, calculation formulas of a liquefaction ratio of biomass and a content of residue are as follows:

liquefaction ratio of biomass=(total liquid mass of product−mass of hydrogenation catalyst−mass of hydrogen-donor solvent)/mass of biomass.

content of residue=mass of residue/(light fraction+ distillate oil).

Embodiment 1

A method for direct liquefaction of biomass, provided by this embodiment of the present invention, comprises the following steps:
(1) a biomass 1 is fed into a biomass pretreatment device 2 to be dried to obtain a dried biomass, and the dried biomass is crushed to obtain a crushed material with a particle size of 10 microns, wherein the crushed material is wheat straw particles;
(2) a hydrogenation catalyst raw material 3 is fed into a hydrogenation catalyst preparation device 4 to carry out loading to obtain a hydrogenation catalyst (with a particle size of 20 microns and a loading amount of 15 wt %) which is amorphous alumina loading a Mo oxide and a Ni oxide, and the obtained hydrogenation catalyst, the crushed material and sulfur are fed into a biomass slurry preparation device 5 to be mixed according to a mass ratio of 3:100:0.3 to obtain a mixture;
(3) the mixture and a hydrogen-donor solvent are mixed to obtain a biomass slurry with a solid content of 25 wt %, wherein the hydrogen-donor solvent is middle/low-temperature coal tar;
(4) the biomass slurry and hydrogen gas 6 are introduced into a first forced circulating suspended-bed reactor 7 to carry out a first liquefaction reaction to obtain a first reaction product, wherein reaction conditions for the first liquefaction reaction are as follows: a reaction temperature is 390 DEG C., a reaction pressure is 18 MPa, a gas-liquid ratio is 1100 NL/kg, and a space velocity of the biomass slurry is 1.2 t/m$^3$·h;
(5) the first reaction product and hydrogen gas are introduced into a second forced circulating suspended-bed reactor 8 to carry out a second liquefaction reaction to obtain a second reaction product, wherein reaction conditions for the second liquefaction reaction are as follows: a reaction temperature is 380 DEG C., a reaction pressure is 20 MPa, a gas-liquid ratio is 1100 NL/kg, and a space velocity of the biomass slurry is 1.3 t/m$^3$·h; (6) the second reaction product is fed into a high-temperature separator 9 and is subjected to a first gas-liquid separation at a temperature of 320 DEG C. to obtain a first liquid phase and a first gas phase;
(7) the first gas phase is introduced into a low-temperature separator 10 and is subjected to a second gas-liquid separation at a temperature of 45 DEG C. to obtain a second liquid phase, and the first liquid phase and the second liquid phase are mixed to obtain a liquid phase mixture;
(8) the liquid phase mixture is fed into a distillation column 11 and is subjected to a first distillation at a temperature of 320 DEG C. under a pressure of 0.5 MPa to obtain a light fraction and a heavy fraction; and
(9) the heavy fraction is fed into a vacuum distillation column 12 and is subjected to a second distillation at a temperature of 350 DEG C. under a pressure of 15 kPa to separate out a distillate oil and a residue, wherein the light fraction and the distillate oil are final liquid of the liquefaction.

Based on tests, the biomass has a yield of the liquid oil of 99 wt %, and the liquid oil has a solid content of residue of lower than 0.2 wt %;

Embodiment 2

A method for direct liquefaction of biomass, provided by this embodiment of the present invention, comprises the following steps:
(1) a biomass 1 is fed into a biomass pretreatment device 2 to be dried to obtain a dried biomass, and the dried biomass is crushed to obtain a crushed material with a particle size of 100 microns, wherein the crushed material is reed straw particles;
(2) a hydrogenation catalyst raw material 3 is fed into a hydrogenation catalyst preparation device 4 to carry out loading to obtain a hydrogenation catalyst (with a particle size of 100-150 microns and a loading amount of 10 wt %) which is amorphous alumina loading a W oxide and a Ni oxide, and the hydrogenation catalyst, the crushed material and sulfur are fed into a biomass slurry preparation device 5 to be mixed according to a mass ratio of 1:100:0.4 to obtain a mixture;
(3) the mixture and a hydrogen-donor solvent are mixed to obtain a biomass slurry with a solid content of 10 wt %, wherein the hydrogen-donor solvent is soybean oil;
(4) the biomass slurry and hydrogen gas 6 are introduced into a first forced circulating suspended-bed reactor 7 to carry out a first liquefaction reaction to obtain a first reaction product, wherein reaction conditions for the first liquefaction reaction are as follows: a reaction temperature is 300 DEG C., a reaction pressure is 25 MPa, a gas-liquid ratio is 800 NL/kg, and a space velocity of the biomass slurry is 2 t/m$^3$·h;
(5) the first reaction product and hydrogen gas are introduced into a second forced circulating suspended-bed reactor 8 to carry out a second liquefaction reaction to obtain a second reaction product, wherein reaction conditions for the second liquefaction reaction are as follows: a reaction temperature is 470 DEG C., a reaction pressure is 13 MPa, a gas-liquid ratio is 1500 NL/kg, and a space velocity of the biomass slurry is 0.3 t/m$^3$·h;
(6) the second reaction product is fed into a high-temperature separator 9 and is subjected to a first gas-liquid separation at a temperature of 290 DEG C. to obtain a first liquid phase and a first gas phase;
(7) the first gas phase is introduced into a low-temperature separator 10 and is subjected to a second gas-liquid separation at a temperature of 60 DEG C. to obtain a second liquid phase, and the first liquid phase and the second liquid phase are mixed obtain a liquid phase mixture;
(8), the liquid phase mixture is fed into a distillation column 11 and is subjected to a first distillation at 400 DEG C. under a pressure of 0.1 MPa to obtain a light fraction and a heavy fraction; and
(9) the heavy fraction is fed into a vacuum distillation column 12 and is subjected to a second distillation at a temperature of 300 DEG C. under a pressure of 20 kPa to separate out a distillate oil and a residue, wherein the light fraction and the distillate oil are final liquid of the liquefaction.

Based on tests, the biomass has a yield of the liquid oil of 98.5 wt %, and the liquid oil has a solid content of residue of lower than 0.21 wt %;

Embodiment 3

A method for direct liquefaction of biomass, provided by this embodiment of the present invention, comprises the following steps:
(1) a biomass 1 is fed into a biomass pretreatment device 2 to be dried to obtain a dried biomass, and the dried biomass is crushed to obtain a crushed material with a particle size of 500 microns, wherein the crushed material is reed straw particles;
(2) a hydrogenation catalyst raw material 3 is fed into a hydrogenation catalyst preparation device 4 to carry out loading to obtain a hydrogenation catalyst (with a particle size of 100-150 microns and a loading amount of 25 wt %) which is amorphous alumina loading a Pd oxide and a Ni oxide, and the hydrogenation catalyst, amorphous iron oxide, the crushed material and sulfur are fed into a biomass slurry preparation device 5 to be mixed according to a mass ratio of 2:2:100:0.3 to obtain a mixture;
(3) the mixture and a hydrogen-donor solvent are mixed to obtain a biomass slurry with a solid content of 50 wt %, wherein the hydrogen-donor solvent is soybean oil;
(4) the biomass slurry and hydrogen gas 6 are introduced into a first forced circulating suspended-bed reactor 7 to carry out a first liquefaction reaction to obtain a first reaction product, wherein reaction conditions for the first liquefaction reaction are as follows: a reaction temperature is 470 DEG C., a reaction pressure is 13 MPa, a gas-liquid ratio is 1500 NL/kg, and a space velocity of the biomass slurry is 0.3 t/m$^3$·h;
(5) the first reaction product and hydrogen gas are introduced into a second forced circulating suspended-bed reactor 8 to carry out a second liquefaction reaction to obtain a second reaction product, wherein reaction conditions for the second liquefaction reaction are as follows: a reaction temperature is 300 DEG C., a reaction pressure is 25 MPa, a gas-liquid ratio is 800 NL/kg, and a space velocity of the biomass slurry is 2 t/m$^3$·h;
(6) the second reaction product is fed into a high-temperature separator 9 and is subjected to a first gas-liquid separation at a temperature of 460 DEG C. to obtain a first liquid phase and a first gas phase;
(7) the first gas phase is introduced into a low-temperature separator 10 and is subjected to a second gas-liquid separation at a temperature of 30 DEG C. to obtain a second liquid phase, and the first liquid phase and the second liquid phase are mixed to obtain a liquid phase mixture;
(8) the liquid phase mixture is fed into a distillation column 11 and is subjected to a first distillation at a temperature of 260 DEG C. under a pressure of 0.7 MPa to obtain a light fraction and a heavy fraction; and
(9) the heavy fraction is fed into a vacuum distillation column 12 and is subjected to a second distillation at a temperature of 300 DEG C. under a pressure of 20 kPa to separate out a distillate oil and a residue, wherein the light fraction and the distillate oil are final liquid of the liquefaction.

Based on tests, the biomass has a yield of the liquid oil of 98.7 wt %, and the liquid oil has a solid content of residue of lower than 0.25 wt %;

Embodiment 4

A method for direct liquefaction of biomass, provided by this embodiment of the present invention, comprises the following steps:
(1) a biomass 1 is fed into a biomass pretreatment device 2 to be dried to obtain a dried biomass, and the dried biomass is crushed to obtain a crushed material with a particle size of 2000 microns, wherein the crushed material is wood chip particles;
(2) a hydrogenation catalyst raw material 3 is fed into a hydrogenation catalyst preparation device 4 to carry out loading to obtain a hydrogenation catalyst (with a particle size of 100-150 microns and a loading amount of 20 wt %) which is amorphous alumina loading a Mo oxide and a Co oxide, and the hydrogenation catalyst, the crushed material and sulfur are fed into a biomass slurry preparation device 5 to be mixed according to a mass ratio of 3:100:0.2 to obtain a mixture;
(3) the mixture and a hydrogen-donor solvent are mixed to obtain a biomass slurry with a solid content of 50 wt %, wherein the hydrogen-donor solvent is low-temperature animal oil;
(4) the biomass slurry and hydrogen gas 6 are introduced into a first forced circulating suspended-bed reactor 7 to carry out a first liquefaction reaction to obtain a first reaction product, wherein reaction conditions for the first liquefaction reaction are as follows: a reaction temperature is 430 DEG C., a reaction pressure is 18 MPa, a gas-liquid ratio is 1200 NL/kg, and a space velocity of the biomass slurry is 0.9 t/m$^3$·h;
(5) the first reaction product and hydrogen gas are introduced into a second forced circulating suspended-bed reactor 8 to carry out a second liquefaction reaction to obtain a second reaction product, wherein reaction conditions for the second liquefaction reaction are as follows: a reaction temperature is 330 DEG C., a reaction pressure is 22 MPa, a gas-liquid ratio is 1000 NL/kg, and a space velocity of the biomass slurry is 1.3 t/m$^3$·h;
(6) the second reaction product is fed into a high-temperature separator 9 and is subjected to a first gas-liquid separation at a temperature of 400 DEG C. to obtain a first liquid phase and a first gas phase;
(7) the first gas phase is introduced into a low-temperature separator 10 and is subjected to a second gas-liquid separation at a temperature of 42 DEG C. to obtain a second liquid phase, and the first liquid phase and the second liquid phase are mixed to obtain a liquid phase mixture;
(8) the liquid phase mixture is fed into a distillation column 11 and is subjected to a first distillation at a temperature of 320 DEG C. under a pressure of 0.6 MPa to obtain a light fraction and a heavy fraction; and
(9) the heavy fraction is fed into a vacuum distillation column 12 and is subjected to a second distillation at a temperature of 330 DEG C. under a pressure of 15 kPa to separate out a distillate oil and a residue, wherein the light fraction and the distillate oil are final liquid of the liquefaction.

Based on tests, the biomass has a yield of the liquid oil of 98 wt %, and the liquid oil has a solid content of residue of lower than 0.3 wt %;

Embodiment 5

A method for direct liquefaction of biomass, provided by this embodiment of the present invention, comprises the following steps:
(1) a biomass 1 is fed into a biomass pretreatment device 2 to be dried to obtain a dried biomass, and the dried biomass is crushed to obtain a crushed material with a particle size of 8 microns, wherein the crushed material is wood chip particles;
(2) a hydrogenation catalyst raw material 3 is fed into a hydrogenation catalyst preparation device 4 to carry out loading to obtain a hydrogenation catalyst (with a particle size of 250-350 microns and a loading amount of 18 wt %) which amorphous alumina loading a W oxide and a Co oxide, and the hydrogenation catalyst, the crushed material and sulfur are fed into a biomass slurry preparation device 5 to be mixed according to a mass ratio of 4:100:0.3 to obtain a mixture;
(3) the mixture and a hydrogen-donor solvent are mixed to obtain a biomass slurry with a solid content of 40 wt %, wherein the hydrogen-donor solvent is low-temperature animal oil;
(4) the biomass slurry and hydrogen gas 6 are introduced into a first forced circulating suspended-bed reactor 7 to carry out a first liquefaction reaction to obtain a first reaction product, wherein reaction conditions for the first liquefaction reaction are as follows: a reaction temperature is 320 DEG C., a reaction pressure is 21 MPa, a gas-liquid ratio is 780 NL/kg, and a space velocity of the biomass slurry is 1.5 t/m$^3$·h;
(5) the first reaction product and hydrogen gas are introduced into a second forced circulating suspended-bed reactor 8 to carry out a second liquefaction reaction to obtain a second reaction product, wherein reaction conditions for the second liquefaction reaction are as follows: a reaction temperature is 330 DEG C., a reaction pressure is 22 MPa, a gas-liquid ratio is 1000 NL/kg, and a space velocity of the biomass slurry is 1.3 t/m$^3$·h;
(6) the second reaction product is fed into a high-temperature separator 9 and is subjected to a first gas-liquid separation at a temperature of 320 DEG C. to obtain a first liquid phase and a first gas phase;
(7) the first gas phase is introduced into a low-temperature separator 10 and is subjected to a second gas-liquid separation at a temperature of 51 DEG C. to obtain a second liquid phase, and the first liquid phase and the second liquid phase are mixed to obtain a liquid phase mixture;
(8) the liquid phase mixture is fed into a distillation column 11 and is subjected to a first distillation at a temperature of 350 DEG C. under a pressure of 0.3 MPa to obtain a light fraction and a heavy fraction; and
(9) the heavy fraction is fed into a vacuum distillation column 12 and is subjected to a second distillation at a temperature of 370 DEG C. under a pressure of 7 kPa to separate out a distillate oil and a residue, wherein the light fraction and the distillate oil are final liquid of the liquefaction.

Based on tests, the biomass has a yield of the liquid oil of 98 wt %, and the liquid oil has a solid content of residue of lower than 0.2 wt %;

Embodiment 6

A method for direct liquefaction of biomass provided by this embodiment of the present invention, as shown in the FIGURE, comprises the following steps:
(1) a biomass 1 is fed into a biomass pretreatment device 2 to be dried to obtain a dried biomass, and the dried biomass is crushed to obtain a crushed material with a particle size of 500 microns, wherein the crushed material is reed straw particles;
(2) a hydrogenation catalyst raw material 3 is fed into a hydrogenation catalyst preparation device 4 to carry out loading to obtain a hydrogenation catalyst (with a particle size of 100-150 microns and a loading amount of 25 wt %) which is amorphous alumina loading a Pd oxide and a Ni oxide; and the hydrogenation catalyst, amorphous iron oxide, the crushed material and sulfur are fed into a biomass slurry preparation device 5 to be mixed according to a mass ratio of 2:2:100:0.3 to obtain a mixture;
(3) the mixture and a hydrogen-donor solvent are mixed to obtain a biomass slurry with a solid content of 50 wt %, wherein the hydrogen-donor solvent is soybean oil;
(4) the biomass slurry and hydrogen gas 6 are introduced into a first forced circulating suspended-bed reactor 7 to carry out a first liquefaction reaction to obtain a first reaction product, wherein reaction conditions for the first liquefaction reaction are as follows: a reaction temperature is 470 DEG C., a reaction pressure is 13 MPa, a gas-liquid ratio is 1500 NL/kg, and a space velocity of the biomass slurry is 0.3 t/m$^3$·h;
(5) the first reaction product and hydrogen gas are introduced into a second forced circulating suspended-bed reactor 8 to carry out a second liquefaction reaction to obtain a second reaction product, wherein reaction conditions for the second liquefaction reaction are as follows: a reaction temperature is 300 DEG C., a reaction pressure is 25 MPa, a gas-liquid ratio is 800 NL/kg, and a space velocity of the biomass slurry is 2 t/m$^3$·h;
(6) the second reaction product is fed into a high-temperature separator 9 and is subjected to a first gas-liquid separation at a temperature of 460 DEG C. to obtain a first liquid phase and a first gas phase;
(7) the first gas phase is introduced into a low-temperature separator 10 and is subjected to a second gas-liquid separation at a temperature of 30 DEG C. to obtain a second liquid phase and a second gas phase, and the first liquid phase and the second liquid phase are mixed to obtain a liquid phase mixture; and the second gas phase and the hydrogen gas in the step (4) and/or the step (5) are mixed to obtain a gas mixture, and the gas mixture is introduced into the reaction system;
(8) the liquid phase mixture is fed into a distillation column 11 and is subjected to a first distillation at a temperature of 260 DEG C. under a pressure of 0.7 MPa to obtain a light fraction and a heavy fraction;
(9) the heavy fraction is fed into a vacuum distillation column 12 and is subjected to a second distillation at a temperature of 300 DEG C. under a pressure of 20 kPa to separate out a distillate oil and a residue, wherein the light fraction and the distillate oil are final liquid of the liquefaction.
(10) the final liquid obtained in the step (9) is fed into a liquefied oil forced circulating suspended-bed hydrogenation reactor 13 to carry out a hydrogenation reaction to obtain a hydrogenation product, wherein reaction conditions for the hydrogenation reaction are as follows: a reaction temperature is 360 DEG C., a reaction pressure is 19 MPa, a gas-liquid ratio is 1100 NL/kg, and a space velocity is 1.5 h$^{-1}$;
(11) the hydrogenation product is fed into a gas-liquid separator 14 and is subjected to a third gas-liquid separation to obtain a third gas phase and a third liquid phase; and the third gas phase and the hydrogen gas in the step (2) and/or step (3) are mixed to obtain a gas mixture, and the gas mixture is introduced into the reaction system, or the third gas phase is discharged to the outside; and
(12) the third liquid phase is fed into a product fractionating column 15 and is subjected to a fractionation operation to obtain a light oil and a heavy oil 16; and the heavy oil 16 is returned to the step (3) to be used as the hydrogen-donor solvent, wherein the fractionation is carried out at a temperature of 330 DEG C.

Based on tests, the biomass has a yield of the liquid oil of 98.7 wt %, and the liquid oil has a solid content of residue of lower than 0.25 wt %;

Embodiment 7

A method for direct liquefaction of biomass, provided by this embodiment of the present invention, as shown in the FIGURE, comprises the following steps:
(1) a biomass 1 is fed into a biomass pretreatment device 2 to be dried to obtain a dried biomass, and the dried biomass is crushed to obtain a crushed material with a particle size of 2000 microns, wherein the crushed material is wood chip particles;
(2) a hydrogenation catalyst raw material 3 is fed into a hydrogenation catalyst preparation device 4 to carry out loading to obtain a hydrogenation catalyst (with a particle size of 100-150 microns and a loading amount of 20 wt %) which is amorphous alumina loading a Mo oxide and a Co oxide, and the hydrogenation catalyst, the crushed material and sulfur are fed into a biomass slurry preparation device 5 to be mixed according to a mass ratio of 3:100:0.2 to obtain a mixture;
(3) the mixture and a hydrogen-donor solvent are mixed to obtain a biomass slurry with a solid content of 50 wt %, wherein the hydrogen-donor solvent is low-temperature animal oil;
(4) the biomass slurry and hydrogen gas 6 are introduced into a first forced circulating suspended-bed reactor 7 to carry out a first liquefaction reaction to obtain a first reaction product, wherein reaction conditions for the first liquefaction reaction are as follows: a reaction temperature is 430 DEG C., a reaction pressure is 18 MPa, a gas-liquid ratio is 1200 NL/kg, and a space velocity of the biomass slurry is 0.9 t/m$^3$·h;
(5) the first reaction product and hydrogen gas are introduced into a second forced circulating suspended-bed reactor 8 to carry out a second liquefaction reaction to obtain a second reaction product, wherein reaction conditions for the second liquefaction reaction are as follows: a reaction temperature is 330 DEG C., a reaction pressure is 22 MPa, a gas-liquid ratio is 1000 NL/kg, and a space velocity of the biomass slurry is 1.3 t/m$^3$·h;

(6) the second reaction product is fed into a high-temperature separator 9 and is subjected to a first gas-liquid separation at a temperature of 400 DEG C. to obtain a first liquid phase and a first gas phase;

(7) the first gas phase is introduced into a low-temperature separator 10 and is subjected to a second gas-liquid separation at a temperature of 42 DEG C. to obtain a second liquid phase and a second gas phase, and the first liquid phase and the second liquid phase are mixed to obtain a liquid phase mixture; and the second gas phase and the hydrogen gas in the step (4) and/or step (5) are mixed to obtain a gas mixture, and the gas mixture is introduced into the reaction system;

(8) the liquid phase mixture is fed into a distillation column 11 and is subjected to a first distillation at a temperature of 320 DEG C. under a pressure of 0.6 MPa to obtain a light fraction and a heavy fraction;

(9) the heavy fraction is fed into a vacuum distillation column 12 and is subjected to a second distillation at a temperature of 330 DEG C. under a pressure of 15 kPa to separate out a distillate oil and a residue, wherein the light fraction and the distillate oil are final liquid of the liquefaction.

(10) the final liquid obtained in the step (9) is fed into a liquefied oil forced circulating suspended-bed hydrogenation reactor 13 to carry out a hydrogenation reaction to obtain a hydrogenation product, wherein reaction conditions for the hydrogenation reaction are as follows: a reaction temperature is 430 DEG C., a reaction pressure is 13 MPa, a gas-liquid ratio is 1500 NL/kg, and a space velocity is 0.5 h$^{-1}$;

(11) the hydrogenation product is fed into a gas-liquid separator 14 and is subjected to a third gas-liquid separation to obtain a third gas phase and a third liquid phase; and the third gas phase and the hydrogen gas in the step (2) and/or step (3) are mixed to obtain a gas mixture, and the gas mixture is introduced into the reaction system, or the third gas phase is discharged to the outside; and

(12) the third liquid phase is fed into a product fractionating column 15 and is subjected to a fractionation operation to obtain a light oil and a heavy oil 16; and the heavy oil 16 is returned to the step (3) to be used as the hydrogen-donor solvent, wherein the fractionation is carried out at a temperature of 390 DEG C.

Based on tests, the biomass has a yield of the liquid oil of 98 wt %, and the liquid oil has a solid content of residue of lower than 0.3 wt %;

Embodiment 8

A method for direct liquefaction of biomass provided by this embodiment of the present invention, as shown in the FIGURE, comprises the following steps:

(1) a biomass 1 is fed into a biomass pretreatment device 2 to be dried to obtain a dried biomass, and the dried biomass is crushed to obtain a crushed material with a particle size of 8 microns, wherein the crushed material is wood chip particles;

(2) a hydrogenation catalyst raw material 3 is fed into a hydrogenation catalyst preparation device 4 to carry out loading to obtain a hydrogenation catalyst (with a particle size of 250-350 microns and a loading amount of 18 wt %) which is amorphous alumina loading a W oxide and a Co oxide, and the hydrogenation catalyst, the crushed material and sulfur are fed into a biomass slurry preparation device 5 to be mixed according to a mass ratio of 4:100:0.3 to obtain a mixture;

(3) the mixture and a hydrogen-donor solvent are mixed to obtain a biomass slurry with a solid content of 40 wt %, wherein the hydrogen-donor solvent is low-temperature animal oil;

(4) the biomass slurry and hydrogen gas 6 are introduced into a first forced circulating suspended-bed reactor 7 to carry out a first liquefaction reaction to obtain a first reaction product, wherein reaction conditions for the first liquefaction reaction are as follows: a reaction temperature is 320 DEG C., a reaction pressure is 21 MPa, a gas-liquid ratio is 780 NL/kg, and a space velocity of the biomass slurry is 1.5 t/m$^3$·h;

(5) the first reaction product and hydrogen gas are introduced into a second forced circulating suspended-bed reactor 8 to carry out a second liquefaction reaction to obtain a second reaction product, wherein reaction conditions for the second liquefaction reaction are as follows: a reaction temperature is 330 DEG C., a reaction pressure is 22 MPa, a gas-liquid ratio is 1000 NL/kg, and a space velocity of the biomass slurry is 1.3 t/m$^3$·h;

(6) the second reaction product is fed into a high-temperature separator 9 and is subjected to a first gas-liquid separation at a temperature of 320 DEG C. to obtain a first liquid phase and a first gas phase;

(7) the first gas phase is introduced into a low-temperature separator 10 and is subjected to a second gas-liquid separation at a temperature of 51 DEG C. to obtain a second liquid phase and a second gas phase, and the first liquid phase and the second liquid phase are mixed to obtain a liquid phase mixture; and the second gas phase and the hydrogen gas in the step (4) and/or step (5) are mixed to obtain a gas mixture, and the gas mixture is introduced into the reaction system;

(8) the liquid phase mixture is fed into a distillation column 11 and is subjected to a first distillation at a temperature of 350 DEG C. under a pressure of 0.3 MPa to obtain a light fraction and a heavy fraction;

(9) the heavy fraction is fed into a vacuum distillation column 12 and is subjected to a second distillation at a temperature of 370 DEG C. under a pressure of 7 kPa to separate out a distillate oil and a residue, wherein the light fraction and the distillate oil are final liquid of the liquefaction.

(10) the final liquid obtained in the step (9) is fed into a liquefied oil forced circulating suspended-bed hydrogenation reactor 13 to carry out a hydrogenation reaction to obtain a hydrogenation product, wherein reaction conditions for the hydrogenation reaction are as follows: a reaction temperature is 300 DEG C., a reaction pressure is 25 MPa, a gas-liquid ratio is 800 NL/kg, and a space velocity is 2 h$^{-1}$;

(11) the hydrogenation product is fed into a gas-liquid separator 14 and is subjected to a third gas-liquid separation to obtain a third gas phase and a third liquid phase; and the third gas phase and the hydrogen gas in the step (2) and/or step (3) are mixed to obtain a gas mixture, and the gas mixture is introduced into the reaction system, or the third gas phase is discharged to the outside; and

(12) the third liquid phase is fed into a product fractionating column 15 and is subjected to a fractionation operation to obtain a light oil and a heavy oil 16; and the heavy oil 16 is returned to the step (3) to be used as the hydrogen-donor solvent, wherein the fractionation is carried out at a temperature of 280 DEG C.

Based on tests, the biomass has a yield of the liquid oil of 98 wt %, and the liquid oil has a solid content of residue of lower than 0.2 wt %;

Embodiment 9

A method for direct liquefaction of biomass, provided by this embodiment of the present invention, comprises the following steps:
(1) a biomass 1 is fed into a biomass pretreatment device 2 to be dried to obtain a dried biomass, and the dried biomass is crushed to obtain a crushed material with a particle size of 10 microns, wherein the crushed material is wheat straw particles;
(2) a hydrogenation catalyst raw material 3 is fed into a hydrogenation catalyst preparation device 4 to carry out loading to obtain a hydrogenation catalyst (with a particle size of 20 microns and a loading amount of 15 wt %) which is amorphous alumina loading a Mo oxide and a Ni oxide, and the hydrogenation catalyst, the crushed material and sulfur are fed into a biomass slurry preparation device 5 to be mixed according to a mass ratio of 3:100:0.3 to obtain a mixture;
(3) the mixture and a hydrogen-donor solvent are mixed to obtain a biomass slurry with a solid content of 25 wt %, wherein the hydrogen-donor solvent is middle/low-temperature coal tar;
(4) the biomass slurry and hydrogen gas 6 are introduced into a first forced circulating suspended-bed reactor 7 to carry out a first liquefaction reaction to obtain a first reaction product, wherein reaction conditions for the first liquefaction reaction are as follows: a reaction temperature is 450 DEG C., a reaction pressure is 14 MPa, a gas-liquid ratio is 1100 NL/kg, and a space velocity of the biomass slurry is 1.2 t/m$^3$·h;
(5) the first reaction product and hydrogen gas are introduced into a second forced circulating suspended-bed reactor 8 to carry out a second liquefaction reaction to obtain a second reaction product, wherein reaction conditions for the second liquefaction reaction are as follows: a reaction temperature is 340 DEG C., a reaction pressure is 14 MPa, a gas-liquid ratio is 1100 NL/kg, and a space velocity of the biomass slurry is 1.3 t/m$^3$·h;
(6) the second reaction product is fed into a high-temperature separator 9 and is subjected to a first gas-liquid separation at a temperature of 320 DEG C. to obtain a first liquid phase and a first gas phase;
(7) the first gas phase is introduced into a low-temperature separator 10 and is subjected to a second gas-liquid separation at a temperature of 45 DEG C. to obtain a second liquid phase, and the first liquid phase and the second liquid phase are mixed to obtain a liquid phase mixture;
(8) the liquid phase mixture is fed into a distillation column 11 and is subjected to a first distillation at a temperature of 320 DEG C. under a pressure of 0.5 MPa to obtain a light fraction and a heavy fraction; and
(9) the heavy fraction is fed into a vacuum distillation column 12 and is subjected to a second distillation at a temperature of 350 DEG C. under a pressure of 15 kPa to separate out a distillate oil and a residue, wherein the light fraction and the distillate oil are final liquid of the liquefaction.

Based on tests, the biomass has a yield of the liquid oil of 98.8 wt %, and the liquid oil has a solid content of residue of lower than 0.23 wt %;

Comparative Example 1

A method for direct liquefaction of biomass provided by this comparative example comprises the following steps:
(1) a biomass 1 is fed into a biomass pretreatment device 2 to be dried to obtain a dried biomass, and the dried biomass is crushed to obtain a crushed material with a particle size of 10 microns, wherein the crushed material is wheat straw particles;
(2) a hydrogenation catalyst raw material 3 is fed into a hydrogenation catalyst preparation device 4 to carry out loading to obtain a hydrogenation catalyst (with a particle size of 20 microns and a loading amount of 15 wt %) which is amorphous alumina loading a Mo oxide and a Ni oxide, and the hydrogenation catalyst, the crushed material and sulfur are fed into a biomass slurry preparation device 5 to be mixed according to a mass ratio of 3:100:0.3 to obtain a mixture;
(3) the mixture and a hydrogen-donor solvent are mixed to obtain a biomass slurry with a solid content of 25 wt %, wherein the hydrogen-donor solvent is middle/low-temperature coal tar;
(4) the biomass slurry and hydrogen gas 6 are introduced into a first forced circulating suspended-bed reactor 7 to carry out a first liquefaction reaction to obtain a first reaction product, wherein reaction conditions for the first liquefaction reaction are as follows: a reaction temperature is 390 DEG C., a reaction pressure is 18 MPa, a gas-liquid ratio is 1100 NL/kg, and a space velocity of the biomass slurry is 1.2 t/m$^3$·h;
(5) the first reaction product and hydrogen gas are introduced into a second forced circulating suspended-bed reactor 8 to carry out a second liquefaction reaction to obtain a second reaction product, wherein reaction conditions for the second liquefaction reaction are as follows: a reaction temperature is 380 DEG C., a reaction pressure is 20 MPa, a gas-liquid ratio is 1100 NL/kg, and a space velocity of the biomass slurry is 1.3 t/m$^3$·h; (6) the second reaction product is fed into a high-temperature separator 9 and is subjected to a gas-liquid separation at a temperature of 320 DEG C. to obtain a liquid phase and a gas phase; and
(7) the liquid phase is fed into a distillation column and is subjected to a distillation at a temperature of 320 DEG C. under a pressure of 0.5 MPa to obtain a light fraction and a heavy fraction;

Based on tests, the biomass has a yield of the liquid oil of 70 wt %, and the light fraction has a content of residue of 5 wt %.

Apparently, the above-described embodiments are merely examples for the clarity of the description, but not intended to be limiting on the implementations of the present invention. For those of ordinary skill in the art, variations or changes in different forms can be made on the basis of the above description. All implementations should not and could not be exhaustive herein. Any derived obvious variations or changes still fall within the protection scope of the present invention.

The invention claimed is:
1. A method for direct liquefaction of biomass, comprising the following steps:
(1) mixing a biomass, a hydrogenation catalyst and a hydrogen-donor solvent to prepare a biomass slurry;

(2) carrying out a first liquefaction reaction with the biomass slurry and hydrogen gas to obtain a first reaction product;

(3) carrying out a second liquefaction reaction with the first reaction product and hydrogen gas to obtain a second reaction product;

(4) subjecting the second reaction product to a first gas-liquid separation at a temperature of 290-460° C. to produce a first liquid phase and a first gas phase;

(5) subjecting the first gas phase to a second gas-liquid separation at a temperature of 30-60° C. to obtain a second liquid phase, and mixing the first liquid phase with the second liquid phase to obtain a liquid phase mixture;

(6) carrying out a first distillation on the liquid phase mixture to obtain a light fraction and a heavy fraction;

(7) carrying out a second distillation on the heavy fraction to separate out a distillate oil and a residue, wherein the light fraction and the distillate oil are final liquid of the liquefaction; and (8) carrying out a hydrogenation reaction on the final liquid to obtain a hydrogenation product, and subjecting the hydrogenation product to a fractionation operation to obtain a light oil and a heavy oil; and returning the heavy oil to the step (1) to be used as the hydrogen-donor solvent, wherein reaction conditions for the hydrogenation reaction are as follows:

a reaction temperature is 300-430° C.;
a reaction pressure is 13-25 MPa;
a gas-liquid ratio is 800-1500 NL/kg;
a space velocity is 0.5-2 $h^{-1}$; and
the fractionation operation is carried out at a temperature of 280-390° C.

2. The method according to claim 1, wherein the step (1) comprises the following steps:
(a) drying the biomass to obtain a dried biomass, and crushing the dried biomass to obtain a crushed material;
(b) mixing the crushed material with the hydrogenation catalyst to obtain a mixture; and
(c) mixing the mixture with the hydrogen-donor solvent to prepare the biomass slurry.

3. The method according to claim 2, wherein in the step (1), a mass ratio of the biomass to the hydrogenation catalyst is 100: (1-5);
the crushed material has a particle size of 5-2000 microns;
the hydrogenation catalyst has a particle size of 10-20 microns; and
the hydrogenation catalyst comprises at least one selected from a group consisting of the following catalysts:
(1) amorphous iron oxide and/or amorphous iron oxide hydroxide; and
(2) amorphous alumina loading an active component, wherein the active component comprises at least one selected from oxides of metals of group VIB, group VIIB and group VIII, and the active component has a content of 10-25 wt % with respect to the mass of the hydrogenation catalyst.

4. The method according to claim 1, wherein in the step (2), reaction conditions for the first liquefaction reaction are as follows:
a reaction temperature is 300-470° C.;
a reaction pressure is 13-25 MPa;
a gas-liquid ratio is 800-1500 NL/kg; and
a space velocity of the biomass slurry is 0.3-2 $t/m^3 \cdot h$.

5. The method according to claim 1, wherein in the step (3), reaction conditions for the second liquefaction reaction are as follows:
a reaction temperature is 300-470° C.;
a reaction pressure is 13-25 MPa;
a gas-liquid ratio is 800-1500 NL/kg; and
a space velocity of the biomass slurry is 0.3-2 $t/m^3 \cdot h$.

6. The method according to claim 1, wherein in the step (6), the first distillation is carried out at a temperature of 260-400° C. under a pressure of 0.1-0.7 MPa; and
in the step (7), the second distillation is carried out at a temperature of 300-400° C. under a pressure of 5-20 kPa.

7. The method according to claim 1, wherein the step (5) further comprises steps of collecting a second gas phase obtained after the second gas-liquid separation, mixing the second gas phase with the hydrogen gas in the step (2) and/or the step (3) to obtain a gas mixture, and introducing the gas mixture into a reaction system.

8. The method according to claim 1, wherein before subjecting the hydrogenation product to the fractionation operation, further comprising steps of subjecting the hydrogenation product to a third gas-liquid separation to obtain a third gas phase and a third liquid phase; and mixing the third gas phase with the hydrogen gas in the step (2) and/or the step (3) to obtain a gas mixture, and introducing the gas mixture into a reaction system, or discharging the third gas phase to the outside, and subjecting the third liquid phase to the fractionation operation.

9. The method according to claim 2, wherein in the step (2), reaction conditions for the first liquefaction reaction are as follows:
a reaction temperature is 300-470° C.;
a reaction pressure is 13-25 MPa;
a gas-liquid ratio is 800-1500 NL/kg; and
a space velocity of the biomass slurry is 0.3-2 $t/m^3 \cdot h$.

10. The method according to claim 3, wherein in the step (2), reaction conditions for the first liquefaction reaction are as follows:
a reaction temperature is 300-470° C.;
a reaction pressure is 13-25 MPa;
a gas-liquid ratio is 800-1500 NL/kg; and
a space velocity of the biomass slurry is 0.3-2 $t/m^3 \cdot h$.

11. The method according to claim 2, wherein in the step (3), reaction conditions for the second liquefaction reaction are as follows:
a reaction temperature is 300-470° C.;
a reaction pressure is 13-25 MPa;
a gas-liquid ratio is 800-1500 NL/kg; and
a space velocity of the biomass slurry is 0.3-2 $t/m^3 \cdot h$.

12. The method according to claim 3, wherein in the step (3), reaction conditions for the second liquefaction reaction are as follows:
a reaction temperature is 300-470° C.;
a reaction pressure is 13-25 MPa;
a gas-liquid ratio is 800-1500 NL/kg; and
a space velocity of the biomass slurry is 0.3-2 $t/m^3 \cdot h$.

13. The method according to claim 4, wherein in the step (3), reaction conditions for the second liquefaction reaction are as follows:
a reaction temperature is 300-470° C.;
a reaction pressure is 13-25 MPa;
a gas-liquid ratio is 800-1500 NL/kg; and
a space velocity of the biomass slurry is 0.3-2 $t/m^3 \cdot h$.

14. The method according to claim 2, wherein in the step (6), the first distillation is carried out at a temperature of 260-400° C. under a pressure of 0.1-0.7 MPa; and in the step (6), the second distillation is carried out at a temperature of 300-400° C. pressure of 5-20 kPa.

15. The method according to claim 3, wherein in the step (6), the first distillation is carried out at a temperature of 260-400° C. under a pressure of 0.1-0.7 MPa; and in the step (6), the second distillation is carried out at a temperature of 300-400° C. pressure of 5-20 kPa.

16. The method according to claim 2, wherein the step (5) further comprises steps of collecting a second gas phase obtained after the second gas-liquid separation, mixing the second gas phase with the hydrogen gas in the step (2) and/or the step (3) to obtain a gas mixture, and introducing the gas mixture into a reaction system.

* * * * *